US012524932B2

(12) United States Patent
Shao et al.

(10) Patent No.: US 12,524,932 B2
(45) Date of Patent: Jan. 13, 2026

(54) MACHINE LEARNING IMAGE RECONSTRUCTION

(71) Applicant: The Johns Hopkins University, Baltimore, MD (US)

(72) Inventors: Wenyi Shao, Laurel, MD (US); Martin Gilbert Pomper, Baltimore, MD (US); Yong Du, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 396 days.

(21) Appl. No.: 17/923,954

(22) PCT Filed: May 7, 2021

(86) PCT No.: PCT/US2021/031358
§ 371 (c)(1),
(2) Date: Nov. 8, 2022

(87) PCT Pub. No.: WO2021/226500
PCT Pub. Date: Nov. 11, 2021

(65) Prior Publication Data
US 2023/0177746 A1    Jun. 8, 2023

Related U.S. Application Data

(60) Provisional application No. 63/022,396, filed on May 8, 2020.

(51) Int. Cl.
*G06T 11/00*    (2006.01)

(52) U.S. Cl.
CPC .......... *G06T 11/005* (2013.01); *G06T 11/008* (2013.01); *G06T 2210/41* (2013.01)

(58) Field of Classification Search
CPC . G06T 11/005; G06T 11/008; G06T 2210/41; G06T 2207/10081;
(Continued)

(56) References Cited

U.S. PATENT DOCUMENTS 9,332,907 B2    5/2016    Vija
10,074,038 B2   9/2018    Hsieh et al.
(Continued)

OTHER PUBLICATIONS

Shi et al. "Deep learning-based attenuation map generation for myocardial perfusion SPECT" (Year: 2020).*
(Continued)

*Primary Examiner* — Andrew W Bee
*Assistant Examiner* — Winta Gebreslassie
(74) *Attorney, Agent, or Firm* — MH2 Technology Law Group LLP

(57) ABSTRACT

Methods, systems, and apparatus, including computer programs encoded on computer-storage media, for machine learning image reconstruction. In some implementations, first input data representing the image of the one or more internal structures generated using a first imaging device is provided as input to a first machine learning model having one or more fully-connected layers. First output data generated by the first machine learning model is obtained and the first output data together with second input data representing a second image of the one or more internal structures generated using a second imaging device is provided to a second machine learning model having one or more convolutional layers. Second output data generated by the second machine learning model is obtained and used to generate rendering data that, when processed by a computing device, causes the computing device to output a reconstructed image.

22 Claims, 6 Drawing Sheets

(58) Field of Classification Search
CPC ... G06T 2207/2022; G06T 2207/10108; G06T 15/00; G06T 15/205; G06N 3/0464; G06V 10/82

See application file for complete search history.

(56) References Cited

U.S. PATENT DOCUMENTS

| | | |
|---|---|---|
| 10,354,171 B2 | 7/2019 | Hsieh et al. |
| 10,565,477 B2 | 2/2020 | Hsieh et al. |
| 2018/0018757 A1 | 1/2018 | Suzuki |
| 2018/0197314 A1* | 7/2018 | De Man ................ G06T 11/006 |
| 2019/0104940 A1 | 4/2019 | Zhou et al. |
| 2019/0108904 A1 | 4/2019 | Zhou et al. |
| 2019/0325621 A1 | 10/2019 | Wang et al. |
| 2020/0065940 A1 | 2/2020 | Tang et al. |

OTHER PUBLICATIONS

Boublil et al., "Spatially-Adaptive Reconstruction in Computed Tomography Using Neural Networks," IEEE Transactions on Medical Imaging, Jul. 2015, 34(7):1474-1485.

International Preliminary Report on Patentability in International Application No. PCT/US2021/03135, mailed on Nov. 17, 2022, 6 pages.

International Search Report and Written Opinion in International Application No. PCT/US2021/031358, dated Aug. 5, 2021, 7 pages.

Shao et al., "A Learned Reconstruction Network for SPECT Imaging," IEEE Trans Radiat Plasma Med Sci. Jan. 2021, 5(1):26-34.

Yin et al., "Domain Progressive 3D Residual Convolution Network to Improve Low-Dose CT Imaging," IEEE Transactions on Medical Imaging, Dec. 2019, 38(12):2903-2913.

* cited by examiner

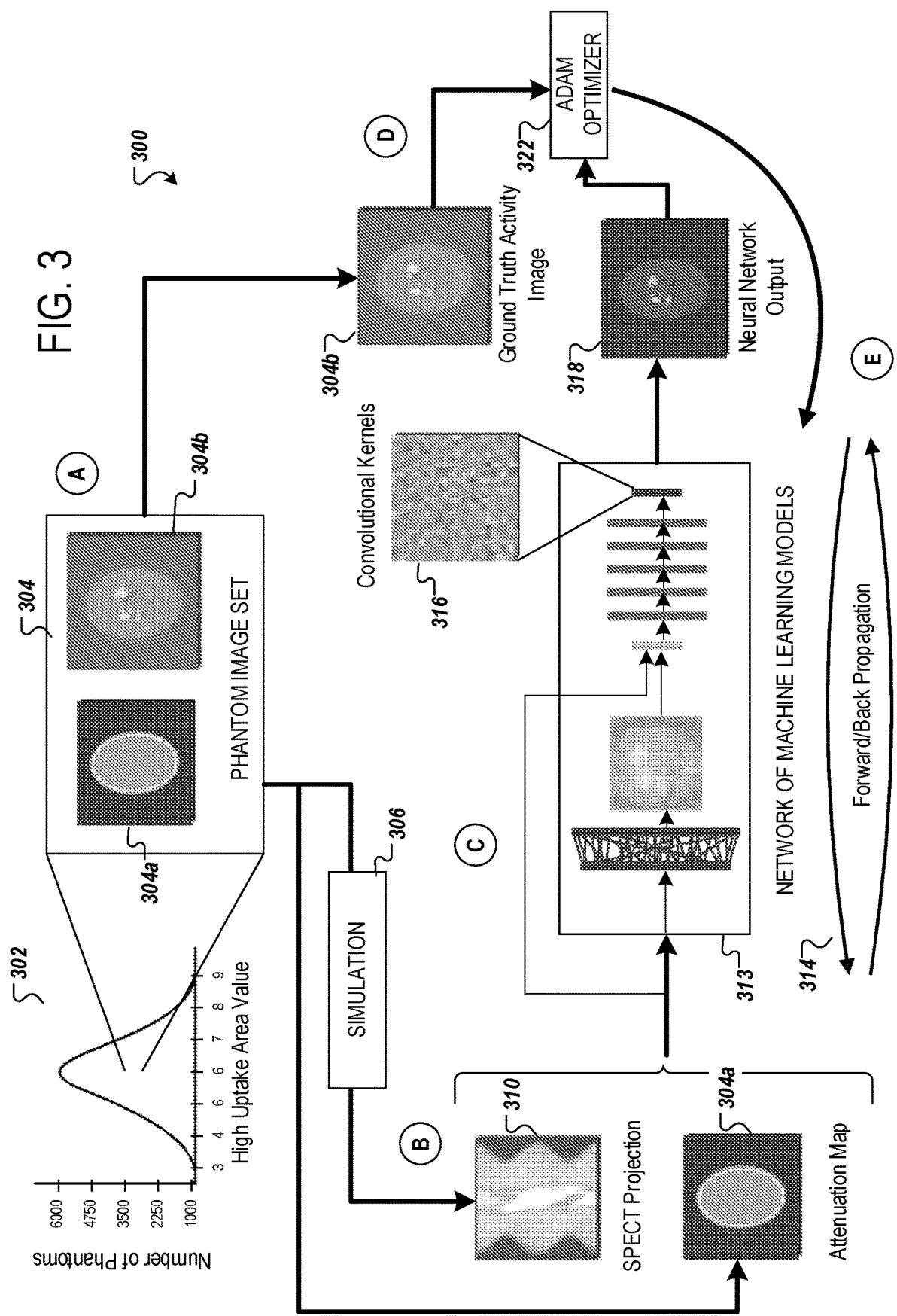

400

```
┌─────────────────────────────────────────────────────────┐
│ GENERATE ONE OR MORE PHANTOM IMAGE SETS, EACH SET       │
│ INCLUDING SECOND INPUT DATA AND GROUND TRUTH DATA       │
│                                                     402 │
└─────────────────────────────────────────────────────────┘
                            ↓
┌─────────────────────────────────────────────────────────┐
│ GENERATE FIRST INPUT DATA CORRESPONDING TO A GIVEN      │
│ PHANTOM IMAGE SET BASED ON THE GIVEN PHANTOM IMAGE SET  │
│                                                     404 │
└─────────────────────────────────────────────────────────┘
                            ↓
┌─────────────────────────────────────────────────────────┐
│ PROVIDE THE FIRST INPUT DATA TO A FIRST MACHINE LEARNING│
│ MODEL HAVING ONE OR MORE FULLY CONNECTED LAYERS         │
│                                                     406 │
└─────────────────────────────────────────────────────────┘
                            ↓
┌─────────────────────────────────────────────────────────┐
│ BASED ON PROVIDING THE FIRST INPUT DATA TO THE FIRST    │
│ MACHINE LEARNING MODEL, GENERATE FIRST OUTPUT DATA      │
│ REPRESENTING AN INITIAL RECONSTRUCTION OF A FIRST IMAGE │
│                                                     408 │
└─────────────────────────────────────────────────────────┘
                            ↓
┌─────────────────────────────────────────────────────────┐
│ PROVIDE THE FIRST OUTPUT DATA AND THE SECOND INPUT DATA │
│ TO A SECOND MACHINE LEARNING MODEL HAVING ONE OR MORE   │
│ CONVOLUTIONAL LAYERS                                410 │
└─────────────────────────────────────────────────────────┘
                            ↓
┌─────────────────────────────────────────────────────────┐
│ BASED ON PROVIDING THE FIRST OUTPUT DATA AND THE SECOND │
│ INPUT DATA TO THE SECOND MACHINE LEARNING MODEL,        │
│ GENERATE SECOND OUTPUT DATA REPRESENTING AN OPTIMIZED   │
│ VERSION OF THE INITIAL RECONSTRUCTION OF THE FIRST IMAGE│
│                                                     412 │
└─────────────────────────────────────────────────────────┘
                            ↓
┌─────────────────────────────────────────────────────────┐
│ BASED ON A DIFFERENCE VALUE BETWEEN THE GROUND TRUTH    │
│ DATA AND THE SECOND OUTPUT DATA, UPDATE PARAMETERS AND  │
│ WEIGHTS WITHIN THE FIRST MACHINE LEARNING MODEL AND THE │
│ SECOND MACHINE LEARNING MODEL                       414 │
└─────────────────────────────────────────────────────────┘
```

FIG. 4

MACHINE LEARNING IMAGE RECONSTRUCTION

CROSS-REFERENCE TO RELATED APPLICATIONS

This application is a National Stage application under 35 U.S.C. § 371 of International Application No. PCT/US2021/031358 having an International Filing Date of May 7, 2021, which claims the benefit of U.S. Provisional Patent Application Ser. No. 63/022,396, filed on May 8, 2020. The disclosures of each of these applications are incorporated herein by reference in their entireties.

GOVERNMENT LICENSE RIGHTS

This invention was made with government support under grants CA140204 and NS094227 awarded by the National Institutes of Health. The government has certain rights in the invention.

FIELD

This specification generally relates to machine learning image reconstruction.

BACKGROUND

Data obtained from one or more imaging devices can be reconstructed to produce images related to the obtained data.

SUMMARY

In general, the subject matter described in this disclosure can be embodied in methods, apparatuses, and systems for training and enabling machine learning image reconstruction based on data of one or more internal structures. In some implementations, the internal structures include elements of the human brain and the data used to reconstruct images of the human brain include data obtained from single-photon emission computerized tomography (SPECT) scans or positron emission tomography (PET) scans. The machine learning image reconstruction is performed using a first machine learning model based on one or more fully connected layers and a second machine learning model based on one or more convolutional layers. Output from the first machine learning model is included as input into the second machine learning model. The second machine learning model generates an optimized version of the output of the first machine learning model. The second machine learning model optimizes the output of the first machine learning model based on reference data obtained from one or more internal structures.

In one aspect, a method is performed for reconstructing an image of one or more internal structures using a network of machine learning models. The method includes providing first input data representing the image of the one or more internal structures generated using a first imaging device as an input to a first machine learning model having one or more fully-connected layers that have been trained to generate first output data that represents an initial reconstruction of a first image based on processing of the first input data by the first machine learning model and obtaining the first output data generated by the first machine learning model based on the first machine learning model processing the first input data. The method also includes providing (i) the first output data and (ii) second input data representing a second image of the one or more internal structures generated using a second imaging device as an input to a second machine learning model having one or more convolutional layers that have been trained to generate second output data representing an optimized version of the initial reconstruction of the first image and obtaining the second output data generated by the second machine learning model based on the second machine learning model processing (i) the first output data and (ii) the second input data. The method includes generating, based on the second output data, rendering data that, when processed by a computing device, causes the computing device to output, on a display of the computing device, the optimized version of the initial reconstruction of the first image.

Implementations may include one or more of the following features. In some implementations, the optimized version of the initial reconstruction of the first image includes an image generated by removing one or more degrading factors from the first image. In some implementations, the one or more degrading factors include noise, attenuation, or resolution blur.

In some implementations, the network of machine learning models is a deep neural network (DNN).

In some implementations, the first imaging device is a single-photon emission computerized tomography (SPECT) scan apparatus and the first input data is projection data from the SPECT scan. In some implementations, the second imaging device is a computed tomography (CT) scan apparatus and the second input data is an attenuation map from the CT scan.

In some implementations, the network of machine learning models is trained using generated data with randomized characteristics.

In some implementations, the generated data forms a distribution over a range of characteristics related to the generated data.

In some implementations, the one or more internal structures include a brain, a heart, or other biological component.

Comparison results between the machine learning reconstruction approach of this specification and an existing clinical approach of reconstruction, ordered subset expectation maximization (OS-EM), show that the machine learning reconstruction approach produces images with higher resolution and more accurate quantification. In addition, the machine learning approach enables reductions in scan time and input data while still producing high quality images. Reductions in scan time enables practitioners to be more efficient while subjecting a given patient to less radiation, for radiation related scans, compared to other image reconstruction approaches.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a diagram showing an example of a system for training a network of machine-learning models to enable machine learning image reconstruction.

FIG. 4 is a flow diagram illustrating an example of a process for training a network of machine-learning models to enable machine learning image reconstruction.

Like reference numbers and designations in the various drawings indicate like elements.

DETAILED DESCRIPTION

Figure 1:
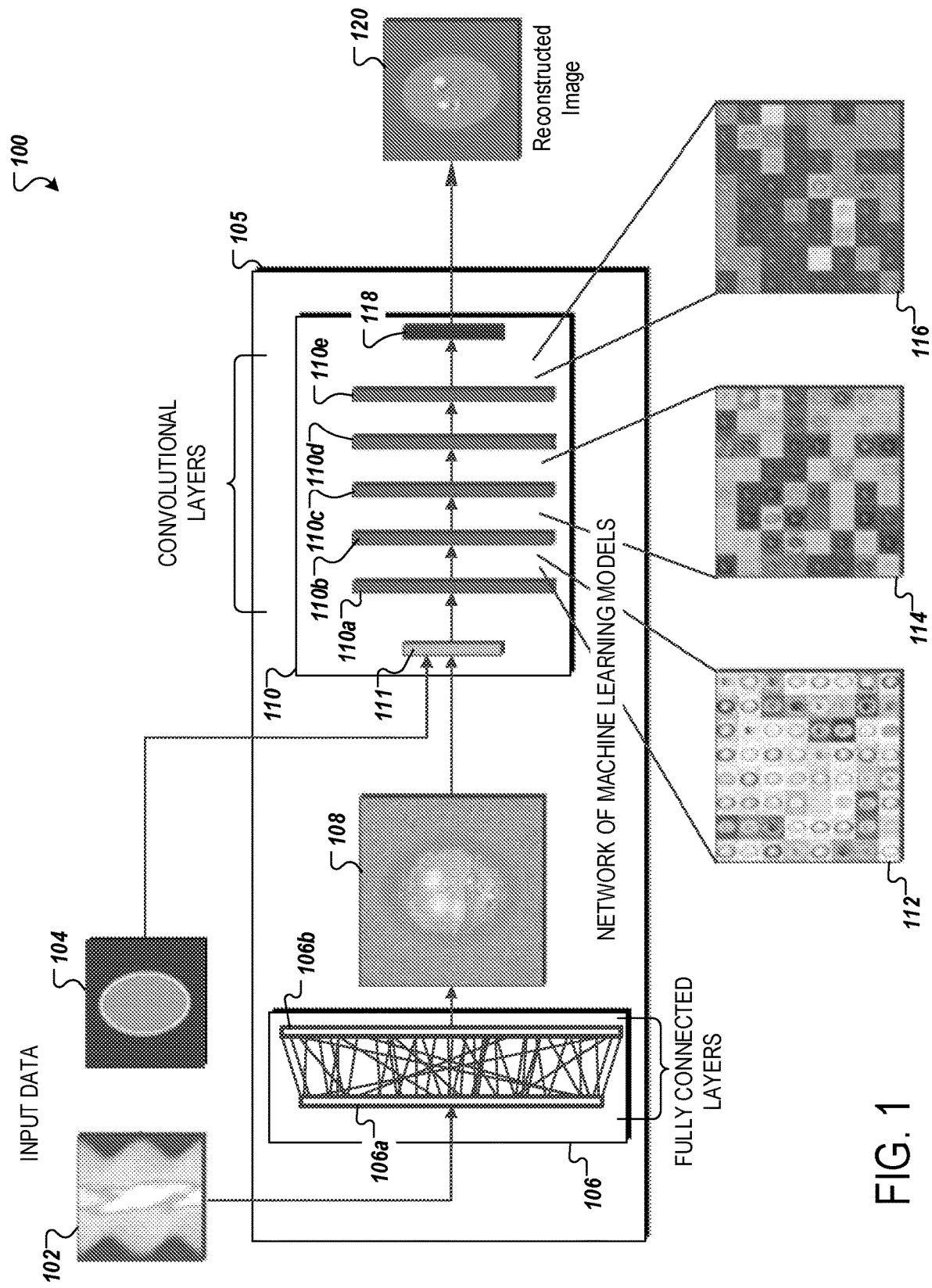
FIG. 1 is a diagram showing an example of a system for machine learning image reconstruction.

The disclosed implementations present techniques for machine learning image reconstruction. Using the disclosed techniques, multiple machine learning models can interact with one another to produce a network of machine learning models that is trained and operated while exchanging data between one another. In one exemplary implementation, a first machine learning model of a network of machine learning models includes one or more fully connected layers. The one or more fully connected layers processes first input data related to data obtained from a first imaging device based on one or more internal structures. The first machine learning model generates first output. The first output of the first machine learning model is combined with second input data obtained from a second imaging device and is used as input for the second machine learning model. The second machine learning model generates an optimized version of the first output while leveraging the second input data. The optimized version of the first output is a representation of the one or more internal structures imaged by the first imaging device.

SPECT is important both clinically and in molecular imaging research. Detecting gamma photons emitted from radiopharmaceuticals, SPECT is used to evaluate normal physiology and a variety of disorders including cardiovascular disease, disorders of the central nervous system, and cancer among others. However, clinical SPECT systems suffer from low spatial resolution and sensitivity due to the need for a collimator to enable image reconstruction. The noise in SPECT images is higher than that of other medical imaging modalities such as positron emission tomography (PET) and magnetic resonance (MR) imaging. Those deficiencies have, in part, prevented SPECT from attaining greater usage within quantitative studies.

Due, in part, to unrecoverable losses of information related to the null space caused by the collimator, improvements to machine learning approaches of reconstruction are possible. Current approaches can be iterative reconstruction algorithms that solve the inverse problem by iteratively updating an image estimation to satisfy a certain criterion. Criteria of image quality, such as spatial resolution, gradually improves with each iteration at the cost of computational time. However, image noise increases as well. To control noise, reconstruction can be stopped early but resulting images are sub-optimal as the criterion may not be fully satisfied. Iterative reconstruction can be time consuming and the accuracy of the system matrix in modeling imaging physics may affect results.

The techniques discussed in this specification generally relate to a machine learning based method for reconstructing images directly which can be applied to SPECT scan data as well as other forms of data. In some implementations, a deep neural network (DNN) can be used. A first machine learning model including fully connected layers can be focused on reconstructing a basic profile of the uptake region within a brain or other portion of a subject's body. A subsequent second machine learning model can use the output of the first machine learning model, together with additional data, such as an attenuation map, to optimize an initial image such as a SPECT image that was provided as input to the first machine learning model. Optimizing the initial image can include, for example, filtering out noise, compensating for image degrading factors such as attenuation and resolution blur, improving contrast of a resulting reconstructed image, or the like.

FIG. 1 is a diagram showing an example of a system 100 for machine learning image reconstruction. The system 100 includes a single-photon emission computerized tomography (SPECT) projection as first input data 102 and an attenuation map as second input data 104. The system 100 also includes a network of machine learning models 105. The network of machine learning models 105 include a first machine learning model 106 and a second machine learning model 110.

In the example of system 100, the first input data 102 and the second input data 104 represent two representations of images of internal structures such as a brain of a subject that may be captured by a computerized tomography (CT) scan, positron emission tomography (PET) scan, SPECT scan, or other imaging technology. The first input data 102 is SPECT or PET projection data in the form of a sinogram which can be angle specific histograms of detected events. As an imaging device rotates around a head, multiple images are captured at different angles. The sinogram is a representation of data related to the images and corresponding angles. The first input data 102 is a sinogram generated based on a SPECT or PET scan in which a radioactive compound, injected into the bloodstream of a human and distributed to different organs, is used as a radioactive tracer. Detections of the radioactive tracer distribution can be used to represent internal structures or biological functions within internal structures. In the example of FIG. 1, activity regions are detected based on the flow of blood, neuron functions, and resulting radiation detection. Though an example of an internal structure is provided in the form of a brain, the present disclosure need not be so limited. Instead, other internal structures that can be represented in either the first image or the second image can include other internal organs, arteries, or the like.

In some implementations, images, as described in this specification, may feature other internal structures that are used for reconstruction. In some cases, other forms of data are used. For example, SPECT or PET scans can be used to ID hardened arteries, blood flow, or valves in a heart. They can also be used to identify various types of tumors, kidney functions, lung function, etc. Imaging data related to these internal structures can be used in a reconstruction process of an image of the heart or other organs in a torso or abdomen. For another example, CT scans of a human organ can be used to aid in optimizing an initial reconstruction of an image based on one or more data items obtained from an imaging scan.

In some implementations, sinograms used in the system 100 are computer generated. For example, instead of performing a SPECT scan, data related to a sinogram can be generated based on existing imaging data or by randomization of data elements within a grid of vector data object. Resulting computer generated images can be used as input within the network of machine learning models 105.

The second input data 104 is an attenuation map. The attenuation map of the second input data 104 is captured during a CT scan. In some cases, the CT scan can be integrated into a SPECT or PET scan resulting in both a SPECT or PET projection data and an attenuation map. The attenuation map can provide details of the tissues or additional anatomical information not available in the SPECT projection data. In the example of FIG. 1, an attenuation map resulting from a brain scan may feature an oval shape with an outline corresponding to the location the human head, the skull surrounding the brain, and the brain itself.

In some implementations, input data corresponding to other internal structures is obtained and used to generate a reconstructed image. For example, instead of obtaining data from brain scans, a system similar to the system 100 can obtain data from heart scans. Based on images of the heart, a network of machine learning models may generate a reconstructed image of blood flow activity within the heart. Other implementations may include obtaining data corresponding to internal structures within both human and non-human bodies.

The first input data 102 is sent to the network of machine learning models 105. In particular, the first input data 102 is sent to the first machine learning model 106. The first machine learning model 106 includes two fully connected layers 106a and 106b. In some implementations, the first machine learning model 106 has more or fewer layers. For example, instead of two fully connected layers, the first machine learning model 106 can have three. The three fully connected layers can perform operations similar to the two fully connected layers 106a and 106b.

In the example of FIG. 1, the two fully connected layers 106a and 106b are used to process the projection data. The first fully connected layer 106a has m neurons while the second fully connected layer 106b as/neurons. Output of the fully connected layers 106a and 106b can be represented mathematically in the function $y_m = \Theta([W_{mn}] \times [x_n] + b_m)$ where $x_n$ is the raw projection data of the first input data 102 having n elements and $W_{nm}$ is an m by n weight matrix. A bias, $b_m$ is also added with corresponding m elements. The non-linear function of the first machine learning model 106 is represented by $\Theta$. The function can be simplified to $y_m = \mathcal{F}_m(x_n)$ for the output $y_m$ of m elements from the first fully connected layer 106a that includes m neurons. The output of the second fully connected layer 106b can be represented as a further transformation of the output of the first fully connected layer 106a. The output of the second fully connected layer 106b can be expressed as $z_l = \mathcal{F}_l(\mathcal{F}_m(x_n))$ for the output $z_l$ of l elements from the second fully connected layer 106b that includes l neurons.

Each of the two fully connected layers 106a and 106b is activated by a hyperbolic tangent function. The output of the second fully connected layer 106b is shaped to an L by L array. The number of elements in the array corresponds to the number of neurons in the second fully connected layer 106b, l.

The output of the first machine learning model 106 is shown as an initial reconstruction 108. The initial reconstruction 108 shows highlighted uptake areas of the brain which can be used to help diagnose or treat certain medical conditions such as Parkinson's disease. In some implementations, the initial reconstruction can also represent an image of other organs such as cardiac imaging, tumor imaging, kidney imaging among others, if the input data 102 is an image such other organ(s). The initial reconstruction 108 can contain noise, relatively low contrast, or other degrading features. The present disclosure can improve the initial reconstruction 108 by optimizing the initial reconstruction 108 to, for example, reduce the noise, compensate for image degrading factors in the initial reconstruction 108 such as attenuation, resolution blur, and scatter. To achieve these optimizations, the initial reconstruction 108 is concatenated with the attenuation map of the second input data 104 in a concatenating layer 111 of the second machine learning model 110. Data elements corresponding to the first input data 102 are combined with data elements corresponding to the second input data 104 to generate input data for the multiple convolutional layers 110a, 110b, 110c, 110d, and 110e of the second machine learning model 110. The multiple convolutional layers 110a, 110b, 110c, 110d, and 110e may be used to automatically optimize the initial reconstruction 108 based on the attenuation map of the second input data 104.

In some implementations, the first input data 102 and the second input data 104 may be combined using other methods. For example, instead of concatenating, a data class with identifiers corresponding to the first and second input data 102 and 104 can be used. In some implementations, the data class with identifiers can be achieved by a data compressing technique, such as a data compressing technique that uses an independent neural network that is trained separately. This method of generating the data class with identifiers using an independent neural network may accelerate convergence during training. The data class is then used as input within the second machine learning model 110.

In some implementations, the initial reconstruction 108 may be replaced by a compressed data item. For example, the compressed data item can include an image with less pixels than a normal image or a vector with a reduced number of variables. In some cases, the first machine learning model 106 is trained to generate the compressed data item and the initial reconstruction 108 is a type of compressed data item, such as a compressed image or vector. The initial reconstruction 108 may be a compact representation of the reconstructed image 120. The first machine learning model 106 may be trained separately to produce a particular compressed data item based on input data, such as the first input data 102 and the second input data 104. By training the first machine learning model 106 to generate a compressed data item with fewer pixels or variables, the training of the first machine learning model 106 can be accelerated. In some cases, the acceleration in training may make training alternative models for alternative input data types feasible so as to extend the applicability of the techniques described herein.

In some implementations, the second machine learning model 110 may be a decoding network. For example, the second machine learning model 110 can be trained to obtain a compressed data item output from the first machine learning model 106 or from an autoencoder network. The autoencoder network may directly obtain output from the first machine learning model 106 and encode the output as an encoded data item that is provided to the second machine learning model 110. The second machine learning model 110 may be trained as a decoder network to generate the reconstructed image 120 based on either compressed data item output generated by the first machine learning model 106 or encoded data generated by an intermediate autoencoder network. By using output corresponding to the compressed data item, either from the first machine learning model 106 or an autoencoder network, the training of the second machine learning model 110 may further be accelerated based on the decreased input data size.

The output of the first machine learning model 106, the initial reconstruction 108, can be represented, as discussed above, with the function $z_l = \mathcal{F}_l(\mathcal{F}_m(x_n))$. A given convolutional layer, for example, the first convolutional layer 110a as shown in FIG. 1, can be represented mathematically as $z'_l = C(z_l, \mu)$ where $\mu$ represents the attenuation map of the second input data 104 and the combined data $z_l$ and $\mu$ represent the result of a concatenation between the first input data 102 and the second input data 104.

The multiple convolutional layers 110a, 110b, 110c, 110d, and 110e of the second machine learning model 110 can be represented mathematically as repeated transformations obtained from each convolutional layer. For example, the multiple convolutional layers 110a, 110b, 110c, 110d, and 110e can be expressed as $C^p$ where p represents the number of convolutional layers applied to input data. In this case, the input data for the multiple convolutional layers 110a, 110b, 110c, 110d, and 110e is $\mathcal{F}_f(\mathcal{F}_m(x_n))$ from the first machine learning model concatenated with u representing the attenuation map of the second input data 104. The resulting expression of the network of machine learning models can be expresses as $z''_l = C^p(\mathcal{F}_f(\mathcal{F}_m(x_n)), \mu)$ where $z''_l$ represents a reconstructed image 120.

Intermediate progression of the second machine learning model 110 is shown in items 112, 114, and 116. The items are grids showing convolved images based on the kernels, filters, or neurons of the second machine learning model 110 applied to the input of the initial reconstruction 108 and the attenuation map 104. The initial reconstruction 108 and the attenuation map 104 are convolved by the first convolution layer 110a to produce 64 feature images shown in image 112. Leveraging the correction by the attenuation map, some feature images produced by the first convolution layer 110a, as shown in item 112, were able to highlight an uptake area and better contour the brain shape initially reconstructed in the initial reconstruction 108.

After the second convolutional layer 110b, item 114 shows a decrease in noise and better construction of the brain shape compared to item 112. Item 116 shows further improvements after the fifth convolutional layer 110e. The contrast of the high-uptake area to the background is further improved and the noise outside the uptake region has been attenuated in many of the feature images. The convolutional layers of the second machine learning model 110 progressively optimize the reconstruction results from the output of the first machine learning model 106 with fully connected layers while leveraging information from the attenuation map. For example, as discussed above, the attenuation map 104 shows the actual region of the brain through attenuation of x-ray transmission signals. This information can be leveraged to improve the shaping and reduce noise of the initial reconstructed image 108.

Between each convolutional layer, additional processes related to machine learning can be performed. For example, batch normalization and nonlinear rectified linear unit (ReLu) function can be performed. In the example of FIG. 1, five convolutional layers, 110a, 110b, 110c, 110d, and 110e, are shown. In other implementations, more or fewer convolutional layers are used. For example, instead of five convolutional layers, four convolutional layers can be used. The four convolutional layers can perform operations similar to the 5 convolutional layers shown in FIG. 1.

Convolutional layers, 110a, 110b, 110c, 110d, and 110e each convolve 64 filters of 3 by 3 with stride 1 and are followed by a batch normalization layer and ReLu. A deconvolution layer 118 convolves 64 filters of 5 by 5 with stride 1 to produce an L by L array that represents the final reconstructed image 120.

In some implementations, a second machine learning model including one or more convolutional layers uses different filters or machine learning methods compared to those discussed in this specification. For example, instead of 64 filters, 49 filters can be used. The 49 filters may be of varying sizes. In general, any number of filters may be used.

In addition, any number of processes in addition to one or more layers of a machine learning model, including non-convolutional layers, may be used within the second machine learning model 110.

The number of elements of the reconstructed image 120 is/corresponding to the number of elements of the initial reconstruction 108, $z_l$. In the example of FIG. 1, the number of elements corresponds to the number of voxels within a data representation. In some implementations, the initial reconstruction 108 is an image 128 pixels by 128 pixels. Each pixel of the 128 by 128 pixel grid denotes a voxel 2 mm by 2 mm. Because the second machine learning model 110 does not change the size of the image but instead uses the attenuation map as reference to improve the initial reconstruction 108, the reconstructed image 120, $z''_l$, also is 128 pixels by 128 pixels with the same number of elements, l, as the initial reconstruction 108. In this example, the number of elements, l, is 128 times 128 or 16,384. The number of elements, m, can be defined as $m = \sqrt{n \cdot l}$. However, the present disclosure is not limited to initial reconstructions 108 images of 128 by 128 pixels. In some implementations, for example, images of other sizes, such as 256 pixels by 256 pixels, can be generated based on application and user requirement.

One benefit of the network of machine learning models 105 as shown in FIG. 1, is that, when retraining is required for imaging with reduced projection data, for example when fast clinic-data acquisition is desired, only the number of learnable parameters in the first layer of the network needs to be modified. For example, the first fully connected layer 106a can be modified. An image with the same size as the initial reconstruction 108 can be obtained even based on reduced projection data. By producing the same input for the second machine learning model 110, the network of machine learning models 105 can be both convenient and flexible. Conventional single convolutional networks could require restructuring of the network based on a change in the input data size. The network of machine learning models 105 would not require such restructuring.

In some implementations, other sources or types of input data can be used without necessitating retraining of aspects of the network 105. For example, if an input image changed from an expected 128 by 128 pixel resolution, preprocessing by the first machine learning model 106 or other item can interpolate or reform the data to present the second machine learning model 110 with expected input data size and type.

The reconstructed image 120 can then be used to render an image corresponding to the brain. The image or data related to the reconstructed image 120 can be used to treat, diagnose, or in other way aid in the understanding of one or more internal structures captured by one or more imaging devices.

The system 100, and other aspects of the present disclosure, are further described with reference to Appendix A, which is herein incorporated by reference in its entirety.

Figure 2:
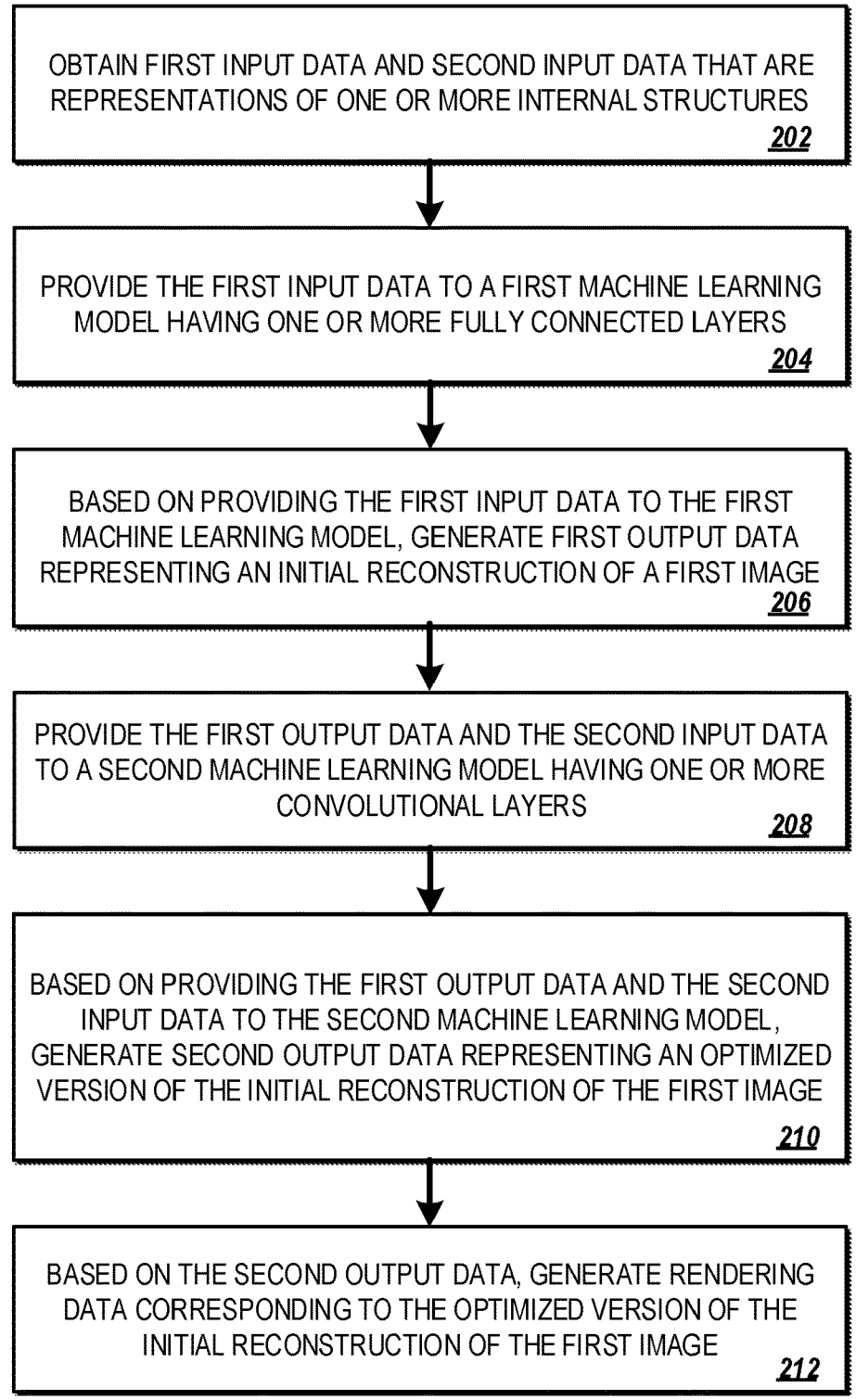
FIG. 2 is a flow diagram illustrating an example of a process for machine learning image reconstruction.

FIG. 2 is a flowchart illustrating an example of a process 200 for machine learning image reconstruction. The process 200 may be performed by one or more electronic systems, for example, the system 100 of FIG. 1. In some implementations, the system 100 includes computers or other electronic devices used to perform one or more calculations.

The process 200 includes obtaining first input data and second input data that are representations of one or more internal structures (202). For example, the first input data 102 and the second input data 104 correspond to data obtained from one or more brain scans. In the example of FIG. 1, the first input data 102 is a sinogram or SPECT or PET projection obtained from a SPECT or PET scan performed on a brain. The second input data 104 is obtained by performing a CT scan on the brain. The regions shown in item 104 show regions of high and low attenuation or loss of x-ray signals transmitted from one side of a brain to the other.

In other implementation, other input data is used. For example, similar internal structure based imaging on the heart can produce images that need to be restructured to reduce noise and optimize locations of elements within the heart or activity within the heart. Input data from scans of the heart can be used in a similar way within a network of machine learning models similar to the network of machine learning models 110 of FIG. 1. Other internal structures both within the human body and within non-human bodies may be used as subject for input data and subsequent image reconstruction.

The process 200 includes providing the first input data to a first machine learning model having one or more fully connected layers (204). For example, the first input data 102 in the form of a sinogram, is provided to the first machine learning model 106. The first machine learning model 106 includes two fully connected layers 106*a* and 106*b* each with a certain number of neurons. As discussed above, other implementations may have more or fewer fully connected layers within the first machine learning model 106.

The process 200 includes, based on providing the first input data to the first machine learning model, generating first output data representing an initial reconstruction of a first image (206). For example, the initial reconstruction 108 is generated based on the first input data 102 and the processing performed on the first input data 102 by the first machine learning model 106.

The process 200 includes providing the first output data and the second input data to a second machine learning model having one or more convolutional layers (208). For example, the initial reconstruction 108 is concatenated with the attenuation map 104 by the concatenating layer 111. The input that includes a concatenated version of the initial reconstruction 108 and the attenuation map 104 is provided to the first convolution layer 110*a* of the second machine learning model 110. The first convolution layer 110*a* processes the input data and generates output that is provided to the second convolution layer 110*b*. Subsequent convolution layers generate output in response to receiving data from preceding convolution layers.

The process 200 includes, based on providing the first output data and the second input data to the second machine learning model, generating second output data representing an optimized version of the initial reconstruction of the first image (210). For example, data from the fifth convolution layer 110*e* is sent to a deconvolution layer 118 that processes the received data by convolving 64 filters of 5 by 5 with stride 1 to generate the reconstructed image 120. The reconstructed image 120 is optimized to remove noise and compensate for other degrading factors such as attenuation and resolution blur.

The process 200 includes based on the second output data, generating rendering data corresponding to the optimized version of the initial reconstruction of the first image (212). For example, in FIG. 1, the reconstructed image 120 represents data rendered that shows the noise-filtered and degrading-factors-compensated version of the initial reconstruction 108.

In some implementations, the rendering data corresponding to the reconstructed image 120 is sent to further processing steps. For example, the rendering data can be sent to additional machine learning networks to identify particular regions within the reconstructed image 120. In some cases, locations corresponding to identifications of particular regions within the reconstructed image 120 can be used for further actions involving treatment, diagnosis, or other operations.

FIG. 3 is a diagram showing an example of a system 300 for training a network of machine-learning models to enable machine learning image reconstruction. The network of machine learning models 313 of the system 300 is similar to the network of machine learning models 105 of FIG. 1. The network of machine learning models 313 represents an untrained version of the network of machine learning models 105 in FIG. 1 that are trained. The system 300 of FIG. 1 depicts a process to train the network of machine learning models 313.

The system 300 includes a generated phantom image set 304 generated based on a given distribution as shown in item 302. The given distribution can be a normal distribution or another type of distribution depending on implementation. Input data similar to the first and second input data of FIG. 1 is shown as a SPECT or PET projection 310 and an attenuation map 312. The SPECT or PET projection 310 is generated based on a simulation 306 using data from the generated phantom image set 304. The system 300 further includes the network of machine learning models 313 discussed above. Forward and back propagation 314 are used to train the network of machine learning models 313. Difference values between neural network output 318 and ground truth activity image 320 are computed and used to update weight parameters within the network of machine learning models 313.

FIG. 3 is shown in stages progressing from stage A to stage E. The stages are meant to illustrate an example order of processes performed by the items of FIG. 3. In stage A, training data is generated. In order to avoid overfitting, data used for training should be rich and diverse. Generated phantom image sets like the phantom image set 304, with a normal distribution as shown in item 302, can be used as training data to perform the neural network training. The phantom image set 304 includes a generated attenuation map 304*a* and a generated activity map 304*b*. The attenuation map 304*a* is generated and corresponds to the shape of the head shown in the activity image 304*b*. The activity image 304*b* shows the desired output of a fully trained network of machine learning models. The activity image 304*b* is used as a ground truth to optimize the network of machine learning models 313.

The phantom image set 304 is generated based on the distribution shown in item 302. The distribution 302, in the example of FIG. 3, is a normal distribution but other distributions are also possible. The distribution summarizes a range of activity levels possible for generated training data with average uptake activity being more probable for any given phantom set generated than very high uptake activity or very low uptake activity. The uptake activity is discussed in reference to FIG. 5 and can be seen as the highlighted portion of the activity image 304*b*. A visual scale can be used to discern the difference between a 3 and a 9 as discussed in FIG. 5.

Real brain scans obtained from SPECT or PET scans performed on a human, depict varying levels of uptake activity. In the scale used in FIG. 3, a level 6 uptake activity would represent both the mode and median of all generated data. As shown in item 302, 6,000 phantom images are generated with a level in the high-uptake region of 6. In total, the amount of training data generated can be any number. In FIG. 3, the system 300 uses 20,000 two-dimensional phantoms like the phantom image set 304 shown. 16,000 phantoms are used for training the network of machine learning models 313, 2,000 are used for validation, and 2,000 are used for final testing. In general, any number of stages and any number of generated training data items can be used during training for a network such as the network of machine learning models 313.

In stage B, data from the generated phantom image set 304 is processed for input into the network of machine learning models. The input includes the attenuation map 304a which is taken directly from the phantom image set 304. The input also includes the SPECT or PET projection 310. The SPECT or PET projection 310 is generated through a simulation process 306 as shown. The simulation process 306 includes an analytical simulation that models effects of attenuation and distance-dependent spatial resolution. The analytical simulation methods can be substituted with other simulation methods, such as Monte Carlo simulation. In the example of FIG. 3, 120 views over 360 degrees were generated with 128 bins for each view. The result is a 120 by 128 sinogram array. Spatial resolution is modeled by using spatially varying Gaussian functions based on a LEHR collimator but other similar processes may be substituted.

In some implementations, different simulation process methods are used. For example, using more or less views, or generating a SPECT or PET projection directly without processing data from an item such as the phantom image set 304 may be used to obtain input data. In general, other data types other than SPECT projection or attenuation map may be used to generate other forms of images from other scan types. In implementations other than brain scan training, other input data related to other internal structures can be used.

In stage C, the input data of the SPECT projection 310 and the attenuation map 304a is provided to the network of machine learning models 313. As discussed in FIG. 1, the SPECT projection 312 is provided for a first machine learning model. Then the output of the first machine learning model is combined with the attenuation map 304a and provided to the second machine learning model. Stage C represents a forward pass within the training process.

Item 316 depicts 64 convolutional kernels in the deconvolution layer. Each block represents a 5 by 5 array of a given kernel. As discussed above, more or fewer kernels can be used in some implementations. In some implementations, the deconvolution layer obtained is different than the one obtained in the example of FIG. 3.

The network of machine learning models 313 generates the neural network output 318. The neural network output 318 is an activity image similar to the activity image 304b of the generated phantom image set 304. Per pixel difference values between the neural network output 318 and the activity image 304b that is regarded in this training process as the ground truth are generated. An ADAM optimizer 322 is used to minimize a common mean-square-error function. Output from the ADAM optimizer 322 can be used to aid in generating modifications and updates to the parameters within the machine learning models of the network of machine learning models 313. Parameters and weight values can be updated during subsequent back propagation through the network of machine learning models 313 as shown in item 314.

In some implementations, other loss functions or optimization methods can be used. For example, other common gradient descent algorithms such as momentum, adagrad, root mean square propagation (RMSprop), among others, may be used. In general, any optimization or loss function technique may be used to train the network of machine learning models 313.

In stage E, data sent from the ADAM optimizer 322 is used for back propagation through the network of machine learning models 313. The weights and parameters of both the first machine learning model and the second machine learning model of the network of machine learning models 313 can be updated to reduce the loss between subsequent forward propagation output and subsequent generated ground truth activities.

FIG. 4 is a flowchart illustrating an example of a process 400 for training a network of machine-learning models to enable machine learning image reconstruction. The process 400 may be performed by one or more electronic systems, for example, the system 300 of FIG. 3.

The process 400 includes generating one or more phantom image sets, each set including second input data and ground truth data (402). For example, the phantom image set 304 is generated based on the distribution shown in item 302. The generated phantom image set 304 includes both an attenuation map 304a and an activity map 304b. The attenuation map 304a is used as input. The activity image 304b is used as ground truth to help optimize the network of machine learning models 313 of FIG. 3

The process 400 includes generating first input data corresponding to a given phantom image set based on the given phantom image set (404). For example, the SPECT projection data 310 is generated from the phantom image set 304. Data related to the phantom image set 304 is provided as input to the simulation process 308. The simulation process 308, discussed above, generates the SPECT projection 310.

The process 400 includes providing the first input data to a first machine learning model having one or more fully connected layers (406). For example, similar to the process detailed in FIG. 1, the SPECT projection 310 is provided as input for the first machine learning model of the network of machine learning models 313.

The process 400 includes based on providing the first input data to the first machine learning model, generating first output data representing an initial reconstruction of a first image (408). For example, similar to the process detailed in FIG. 1, an initial reconstruction of a first image is generated based on the SPECT projection 310.

The process 400 includes providing the first output data and the second input data to a second machine learning model having one or more convolutional layers (410). For example, similar to the process detailed in FIG. 1, the initial reconstruction is combined with the attenuation map 304a to generate input data. The input data is provided to the second machine learning model of the network of machine learning models 313 that has five convolutional layers.

The process 400 includes based on providing the first output data and the second input data to the second machine learning model, generating second output data representing an optimized version of the first image (412). For example, similar to the process detailed in FIG. 1, the neural network output 318 is generated as an optimized version of the initial reconstruction based on the attenuation map 304a and the second machine learning model of the network of machine learning models 313. The reconstructed image 120 is optimized to remove noise and compensate for other degrading factors such as attenuation and resolution blur.

The process 400 includes based on a difference value between the ground truth data and the second output data, updating parameters and weights within the first machine learning model and the second machine learning model (414). For example, the ground truth activity image 304b is compared with the neural network output 318. The ADAM optimizer 322 is used, in part, to generate updated weights and parameters for one or more layers within the network of machine learning models 313.

Figure 5:
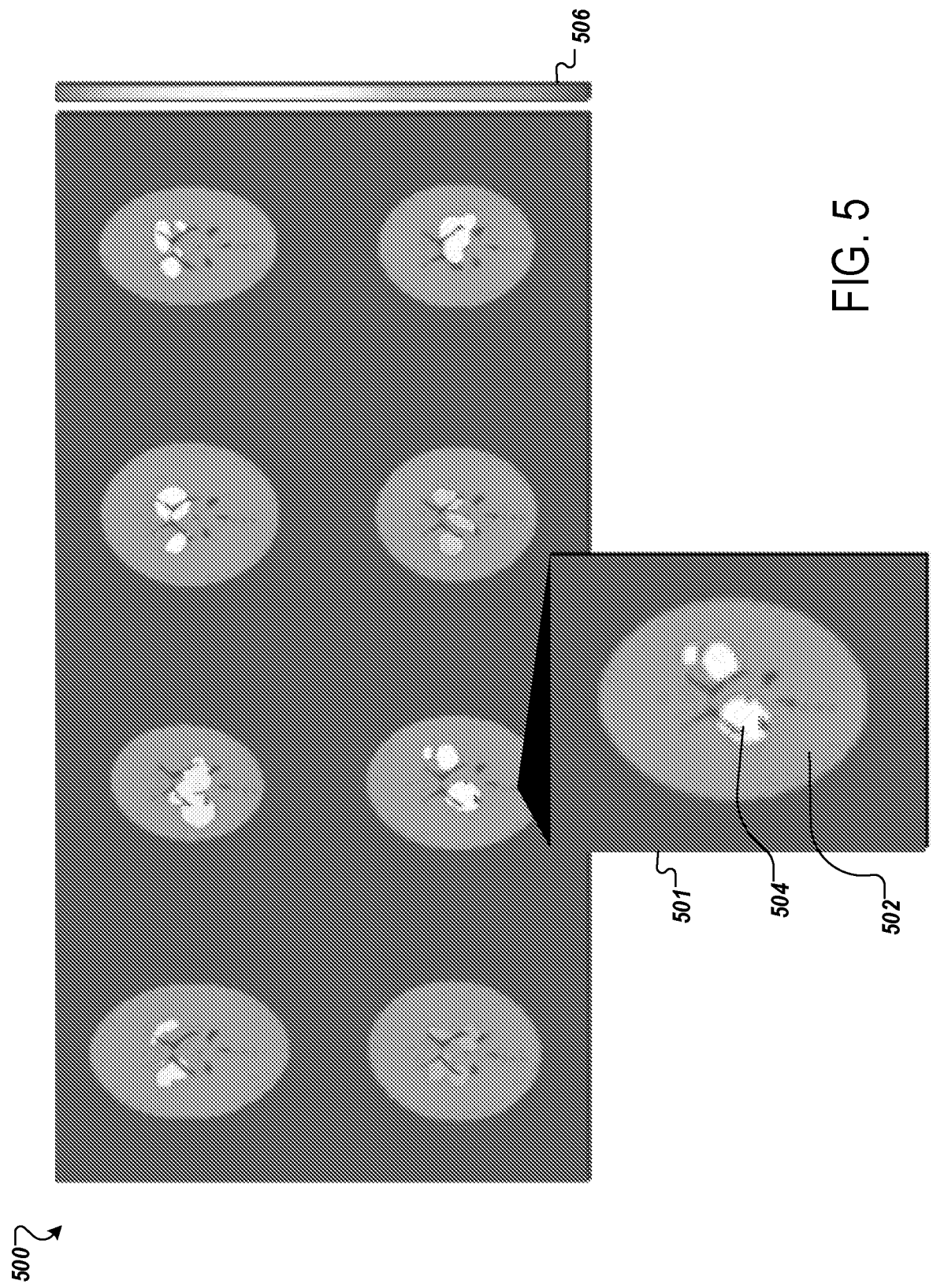
FIG. 5 is a diagram showing an example of generated phantom activity images of a brain.

FIG. 5 is a diagram showing an example of generated phantom activity images 500 of a brain. Item 501 shows an example activity image showing an active region 504 that is highlighted with respect to the non-active region 502. A scale 506 is used to determine the degree of activity. In the example of FIG. 5, lighter shades correspond to more average levels of activity while darker shades correspond to abnormal activity, either high or low. Color scales can be used to more accurately identify regions of high activity.

In some implementations, other forms of activity identification can be used. For example, data used to render images such as item 501 can also store numerical values associated with both a given location within the item 501 and the corresponding level of activity within a region corresponding to the given location. In some cases, thresholds or other processing steps can use numerical values of activity to perform further operations related to systems as discussed in reference to FIG. 1 and FIG. 3.

In some implementations, the first imaging device and the second imaging device used to obtain first and second input data is the same imaging device. For example, a combination of SPECT and CT systems can be used to generate both a SPECT projection and an attenuation map. Other sources of data can be used to as input within a system such as the network of machine learning models 105.

In some implementations, other forms of generated training data can be used. For example, a Zubal human brain phantom can be used as an element of a training data set. The Zubal human brain phantom can be used to train a network of machine learning models such as the network of machine learning models 313 of FIG. 3.

In some implementations, improvements made possible by the machine learning reconstruction approach enable less data to be collected by an imaging device. For example, in a given SPECT scan, the patient may only need to sit for half as long as a scan that uses a typical OS-EM method for reconstruction. The machine learning model approach can piece together an image with data from fewer angles and shorter exposure times. The resulting reduction in radiation doses in some scans, as well as other benefits, represents an improvement offered by the machine learning image reconstruction approach.

In some implementations, a machine learning reconstruction approach offers time benefits. For example, a fully trained machine learning network can reconstruct an image based on input data almost instantaneously since no iteration is required.

In some implementations, kernels within the second machine learning model can be checked. For example, kernels can be checked to verify that specific rules have been learned by the kernels or an appropriate number was included in each convolutional layer. In some cases, if one or more kernels in a layer does not contain certain information, e.g., parameters are all close or zero, the number of kernels can be reduced. Similarly, kernels can be added based on further processing of existing kernel data.

In some implementations, preprocessing on input data provided to a machine learning model is performed. For example, if patient data includes images with pixel size of 3.895 mm, but the model expects 2 mm, the patient data can be interpolated to match the expected 2 mm pixel size.

Figure 6:
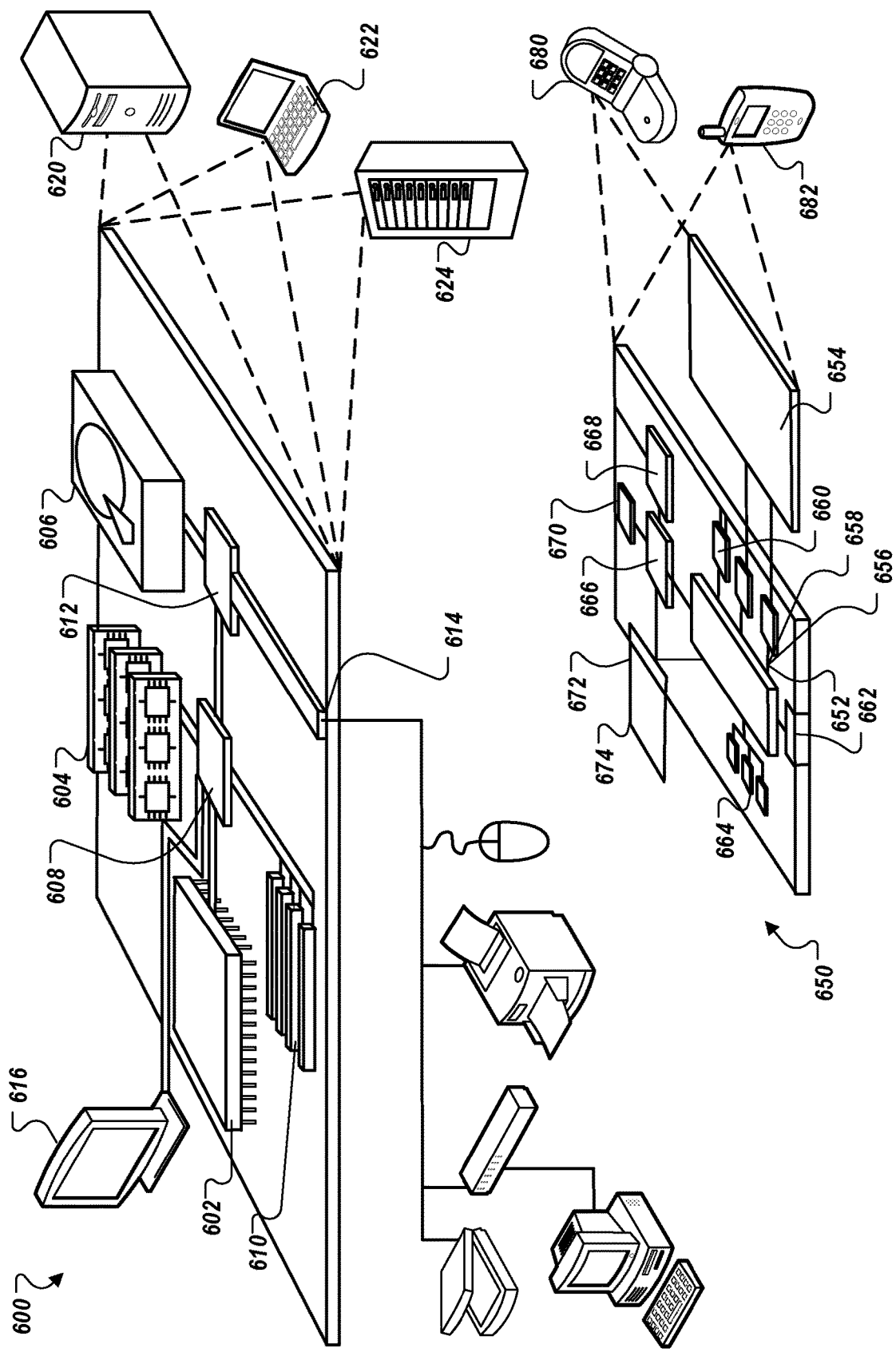
FIG. 6 is a diagram illustrating an example of a computing system used for machine learning image reconstruction.

FIG. 6 is a diagram illustrating an example of a computing system used for image reconstruction using a machine-learning network.

The computing system includes computing device 600 and a mobile computing device 650 that can be used to implement the techniques described herein. For example, one or more parts of the network of machine learning models 105 could be an example of the system 600 described here, such as a computer system implemented in any of the machine-learning networks, devices that access information from the machine-learning networks, or a server that accesses or stores information regarding the processing performed by the machine-learning networks.

The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, graphic processing units (GPU) can be added into 600 and connected with 602 to perform numerical computations such as neural-network training. In some implementations, the processor 602 is a single threaded processor. In some implementations, the processor 602 is a multi-threaded processor. In some implementations, the processor 602 is a quantum computer.

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine readable mediums (for example, the memory 604, the storage device 606, or memory on the processor 602). The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may include one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry in some cases. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 668 using a radio frequency. In addition, short-range communication may occur, such as using a Bluetooth, Wi-Fi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, among others) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for reconstructing an image of one or more internal structures using a network of machine learning models, the method comprising:
    providing projection data from a single-photon emission computerized tomography (SPECT) scan representing the image of the one or more internal structures, and generated using SPECT scan apparatus, as an input to a first machine learning model having one or more fully-connected layers that have been trained to generate first output data that represents an initial reconstruction of a first image based on processing of the projection data from the SPECT scan by the first machine learning model;
    obtaining the first output data generated by the first machine learning model based on the first machine learning model processing the projection data from the SPECT scan;
    providing (i) the first output data and (ii) an attenuation map from a computed tomography (CT) scan representing a second image of the one or more internal structures, and generated using a CT scan apparatus, as an input to a second machine learning model having one or more convolutional layers that have been trained to generate second output data representing an optimized version of the initial reconstruction of the first image;
    obtaining the second output data generated by the second machine learning model based on the second machine learning model processing (i) the first output data and (ii) the attenuation map from the CT scan; and
    generating, based on the second output data, rendering data that, when processed by a computing device, causes the computing device to output, on a display of the computing device, the optimized version of the initial reconstruction of the first image.

2. The method of claim 1, wherein the optimized version of the initial reconstruction of the first image includes an image generated by removing one or more degrading factors from the first image.

3. The method of claim 2, wherein the one or more degrading factors include noise, attenuation, or resolution blur.

4. The method of claim 1, wherein the network of machine learning models is a deep neural network (DNN).

5. The method of claim 1, wherein the network of machine learning models is trained using generated data with randomized characteristics.

6. The method of claim 5, wherein the generated data forms a distribution over a range of characteristics related to the generated data.

7. The method of claim 1, wherein the one or more internal structures include a brain, a heart, or other biological component.

8. The method of claim 1, wherein the first output data is a first compressed data item generated by the first machine learning model based on the first machine learning model processing the projection data from the SPECT scan, and wherein the initial reconstruction of the first image is a compressed data item.

9. A non-transitory, computer-readable medium storing one or more instructions executable by a computer system to perform operations for reconstructing an image of one or more internal structures using a network of machine learning models comprising:
    providing projection data from a single-photon emission computerized tomography (SPECT) scan representing the image of the one or more internal structures, and generated using SPECT scan apparatus, as an input to a first machine learning model having one or more fully-connected layers that have been trained to generate first output data that represents an initial reconstruction of a first image based on processing of the projection data from the SPECT scan by the first machine learning model;
    obtaining the first output data generated by the first machine learning model based on the first machine learning model processing the projection data from the SPECT scan;
    providing (i) the first output data and (ii) an attenuation map from a computed tomography (CT) scan representing a second image of the one or more internal structures, and generated using a CT scan apparatus, as an input to a second machine learning model having one or more convolutional layers that have been trained to generate second output data representing an optimized version of the initial reconstruction of the first image;
    obtaining the second output data generated by the second machine learning model based on the second machine learning model processing the (i) the first output data and (ii) the attenuation map from the CT scan; and
    generating, based on the second output data, rendering data that, when processed by a computing device, causes the computing device to output, on a display of the computing device, the optimized version of the initial reconstruction of the first image.

10. The non-transitory, computer-readable medium of claim 9, wherein the optimized version of the initial reconstruction of the first image includes an image generated by removing one or more degrading factors from the first image.

11. The non-transitory, computer-readable medium of claim 10, wherein the one or more degrading factors include noise, attenuation, or resolution blur.

12. The non-transitory, computer-readable medium of claim 9, wherein the network of machine learning models is a deep neural network (DNN).

13. The non-transitory, computer-readable medium of claim 9, wherein the network of machine learning models is trained using generated data with randomized characteristics.

14. The non-transitory, computer-readable medium of claim 13, wherein the generated data forms a distribution over a range of characteristics related to the generated data.

15. The non-transitory, computer-readable medium of claim 9, wherein the one or more internal structures include a brain, a heart, or other biological component.

16. A system, comprising:
one or more processors; and
machine-readable media interoperably coupled with the one or more processors and storing one or more instructions that, when executed by the one or more processors, perform operations for reconstructing an image of one or more internal structures using a network of machine learning models comprising:
providing projection data from a single-photon emission computerized tomography (SPECT) scan representing the image of the one or more internal structures, and generated using a SPECT scan apparatus, as an input to a first machine learning model having one or more fully-connected layers that have been trained to generate first output data that represents an initial reconstruction of a first image based on processing of the projection data from the SPECT scan by the first machine learning model;
obtaining the first output data generated by the first machine learning model based on the first machine learning model processing the projection data from the SPECT scan;
providing (i) the first output data and (ii) an attenuation map from a computed tomography (CT) scan representing a second image of the one or more internal structures, and generated using a CT scan apparatus, as an input to a second machine learning model having one or more convolutional layers that have been trained to generate second output data representing an optimized version of the initial reconstruction of the first image;
obtaining the second output data generated by the second machine learning model based on the second machine learning model processing the (i) the first output data and (ii) the attenuation map from the CT scan; and
generating, based on the second output data, rendering data that, when processed by a computing device, causes the computing device to output, on a display of the computing device, the optimized version of the initial reconstruction of the first image.

17. The system of claim 16, wherein the optimized version of the initial reconstruction of the first image includes an image generated by removing one or more degrading factors from the first image.

18. The system of claim 17, wherein the one or more degrading factors include noise, attenuation, or resolution blur.

19. The system of claim 16, wherein the network of machine learning models is a deep neural network (DNN).

20. The system of claim 16, wherein the network of machine learning models is trained using generated data with randomized characteristics.

21. The system of claim 20, wherein the generated data forms a distribution over a range of characteristics related to the generated data.

22. The system of claim 16, wherein the one or more internal structures include a brain, a heart, or other biological component.

* * * * *